March 10, 1953 R. M. ULRICH 2,630,930
LOADER FOR TRACTORS
Filed July 1, 1947 4 Sheets-Sheet 1

Inventor
Raymond M. Ulrich
By Alois W. Graf
Atty.

March 10, 1953 R. M. ULRICH 2,630,930
LOADER FOR TRACTORS
Filed July 1, 1947 4 Sheets-Sheet 2
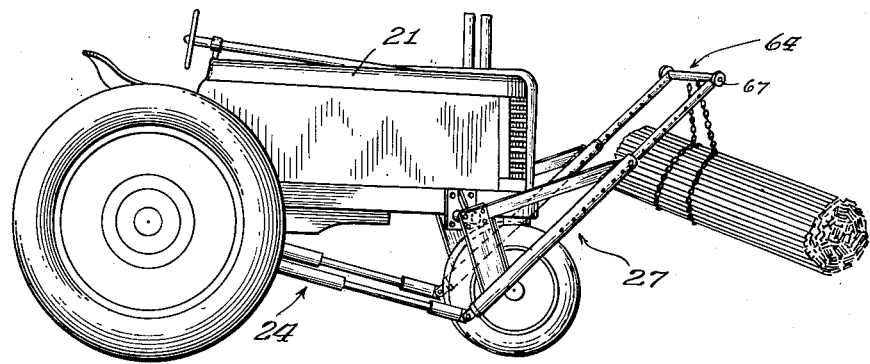
Fig. 3.
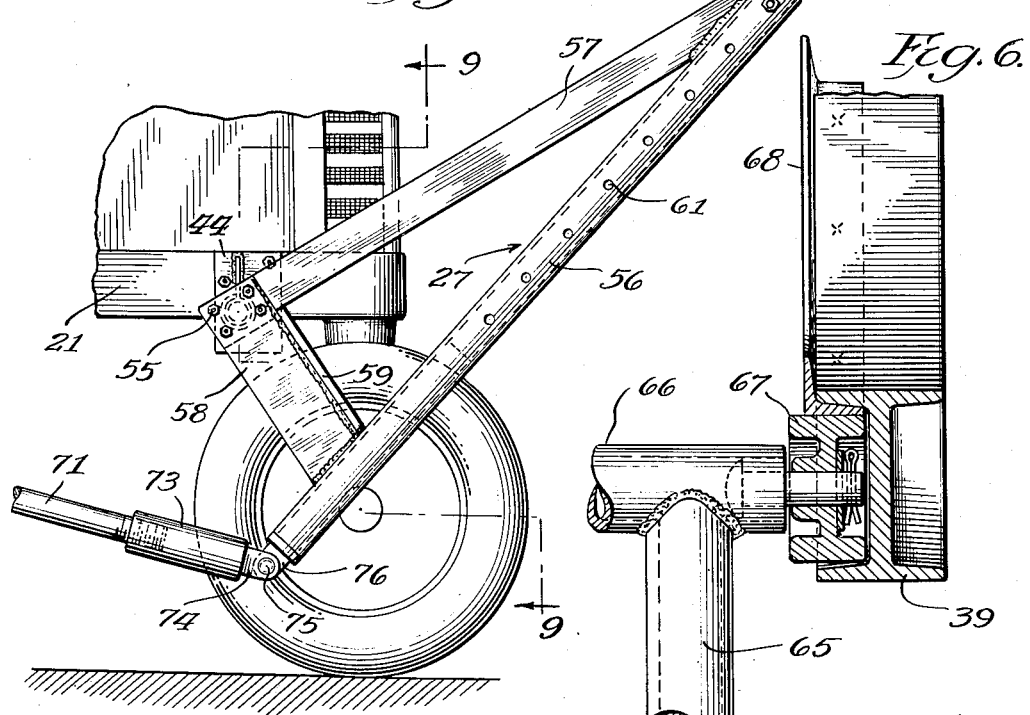
Fig. 4.
Fig. 6.
Inventor
Raymond M. Ulrich
By Alois W. Graf
Atty

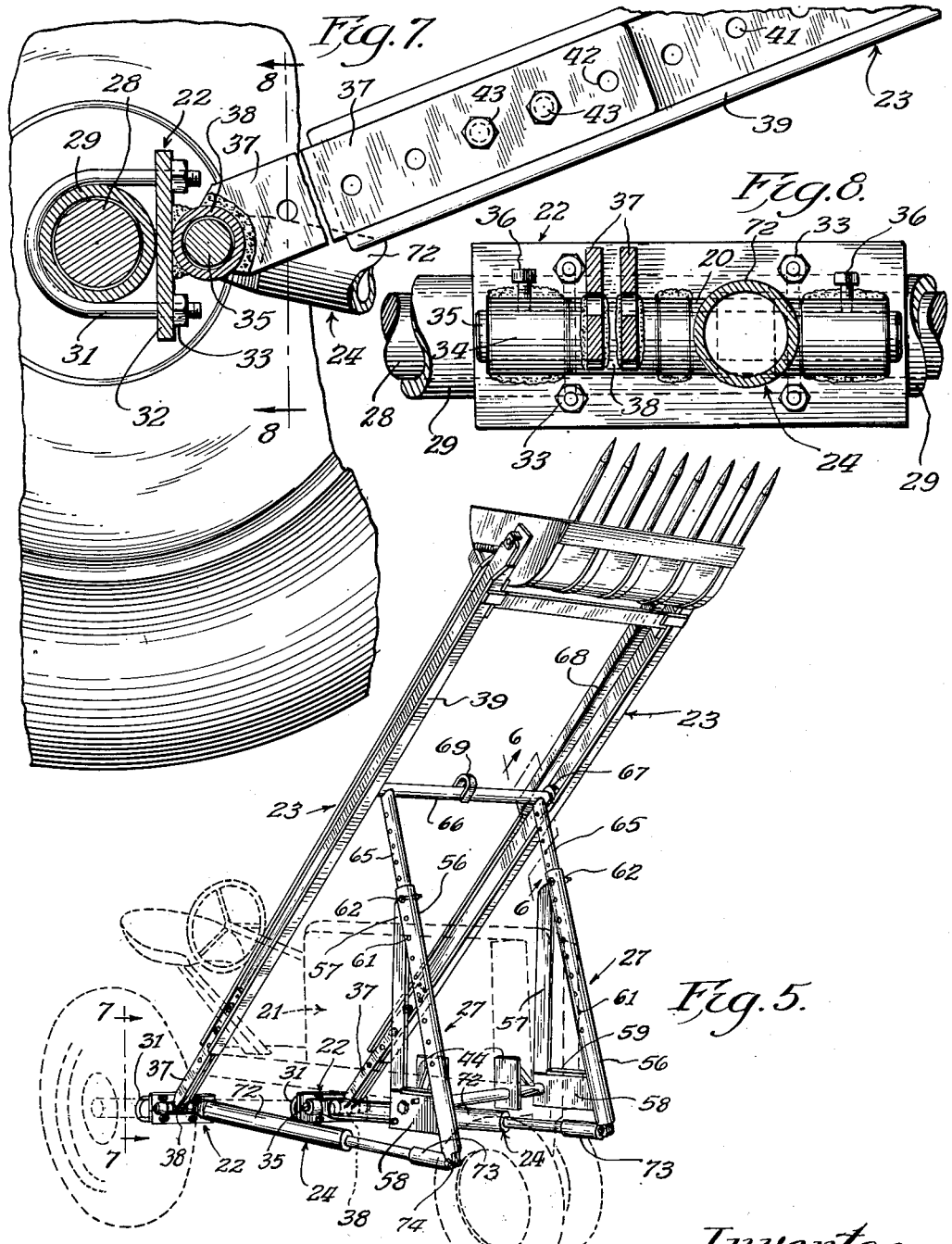

March 10, 1953  R. M. ULRICH  2,630,930
LOADER FOR TRACTORS
Filed July 1, 1947  4 Sheets-Sheet 4

Inventor
Raymond M. Ulrich
By Alois W. Graf Atty

Patented Mar. 10, 1953

2,630,930

UNITED STATES PATENT OFFICE 2,630,930

LOADER FOR TRACTORS

Raymond M. Ulrich, Roanoke, Ill., assignor to Ulrich Foundation, Inc., a corporation of Delaware Application July 1, 1947, Serial No. 758,299

2 Claims. (Cl. 214—141)

The present invention relates to loaders for tractors, and more particularly to a loader of the type arranged to be attached to a farm tractor.

Heretofore, loaders have been provided particularly for attachment to farm tractors to serve primarily as a loading device for various operations on a farm such as loading fertilizer. Generally, such loaders have employed a pair of lifting means which have been raised and lowered by a mechanism supported at the front of the tractor. Such mechanism has in the past included a frame extending an appreciable distance above the tractor together with suitable levers and pulleys. In such an arrangement it has been found that the view ahead of the tractor has been considerably obstructed by the framework which has the further disadvantage of preventing the storing of the tractor in a shed. Some of the arrangements heretofore provided have had other disadvantages such as not being readily detachable from the tractor so that considerable time is required to prepare the tractor for use for the purpose of cultivating, sowing and doing other farm tasks.

It, therefore, is an object of the present invention to provide an improved loader or lifting device suitable for attachment to tractors.

It is a further object of the present invention to provide an improved loader for attachment to tractors which is readily adjusted for it to be adapted for use with a large number of different tractors or to provide different degrees of elevation of the loading shovel.

Still another object of the present invention is to provide in a farm tractor loader an arrangement whereby a portion of the loader may be used as a boom.

A still further object of the present invention is to provide an improved mounting arrangement for the components of a loader for a farm tractor whereby the loader is readily detached.

A still further object of the present invention is to provide a loader with a minimum number of parts which is relatively rigid and not subject to distortion when used.

A still further object of the present invention is to provide an improved loader for a tractor which will have a minimum of weight at the front of the tractor so as to distribute the load more equally in accordance with the normal load distribution on the tractor wheels.

A still further object of the present invention is to provide a loader for a tractor a construction which is relatively simple and economical to manufacture.

Other and further objects of the invention subsequently will become apparent by reference to the following description taken in conjunction with the accompanying drawings wherein:

Figure 3 is a side view illustrating another use of the loader of Figure 1;

Figure 4 is a detailed view of the arrangement shown in Figure 3;

Figure 5 is a perspective view of the loader per se illustrating the position of maximum lift;

Figure 6 is a detailed view of a portion of the mechanism as seen in the direction of the arrows along the line 6—6 of Figure 5;

Figure 7 is a detailed view of the rear axle mounting;

Figure 8 is a view of the mounting shown in Figure 7 as seen in the direction of the arrows along the line 8—8;

Figure 1:
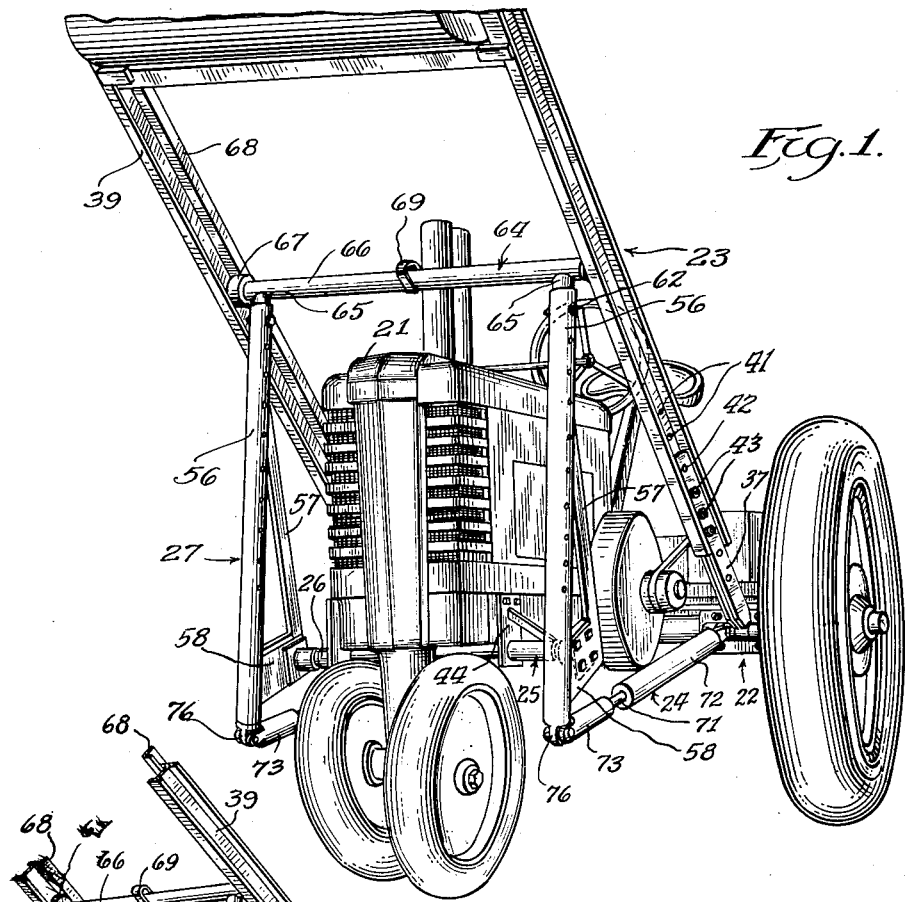
Figure 1 is a perspective top view of a tractor having secured thereto a loader constructed in accordance with the present invention.
Figure 2:
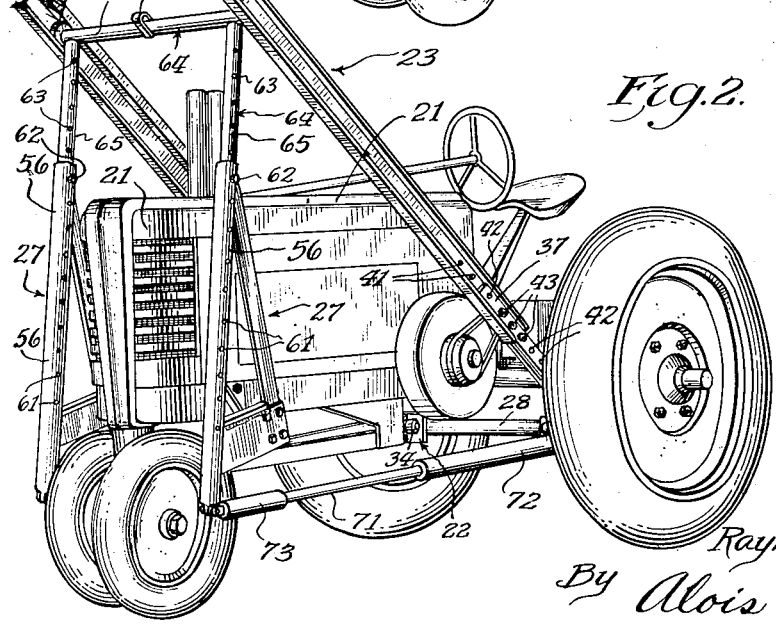
Figure 2 is another perspective view showing the side of the tractor and loader of Figure 1.

Referring more particularly to Figures 1 and 2 of the drawing wherein is shown a tractor 21 to which the present invention has been applied. The loader comprising the present invention is supported by a plurality of brackets. On the rear axle two bracket supports 22 are provided for pivotally anchoring the extremity of the lifting beam 23 and the hydraulic cylinder 24. Adjacent the front end of the tractor a pair of brackets 25 and a cross shaft 26 are provided for supporting a pair of lever arms 27.

The construction of the rear axle brackets 22 is illustrated in detail in Figures 7 and 8. The rear tractor axle 28 is contained in a housing 29 about which are fitted a plurality of clevises 31. These clevises or U-shaped bolts 31 pass through a support plate 32 which is held in position by a plurality of nuts 33 on the threaded extremities of the clevis 31. Welded to the plate 32 are a plurality of bosses which carry a shaft or rod 35 held in position in the bosses by suitable fastening means such as a set screw 36. The rod 35 or bearing shaft passes through the adjustable plates 37 which form the rear extremity of the lifting beam or lever 23. The adjustable plates 37 may be provided with a bearing member or boss 38 which is welded thereto. Each cylinder 24 at its rear end is welded to a bearing member 20 through which the rod 35 extends in the bracket 22. The forward portion of the lifting means 23 consists of an I-beam 39 which at its rear extremity is provided with a plurality of spaced holes 41. The plates 37 likewise are provided with a plurality of spaced holes 42 so that a plurality of bolts 43 may be employed to pass through the holes 41 and 42 to secure together in proper adjusted relation the I-beam 39 and the plates 37.

Figure 9:
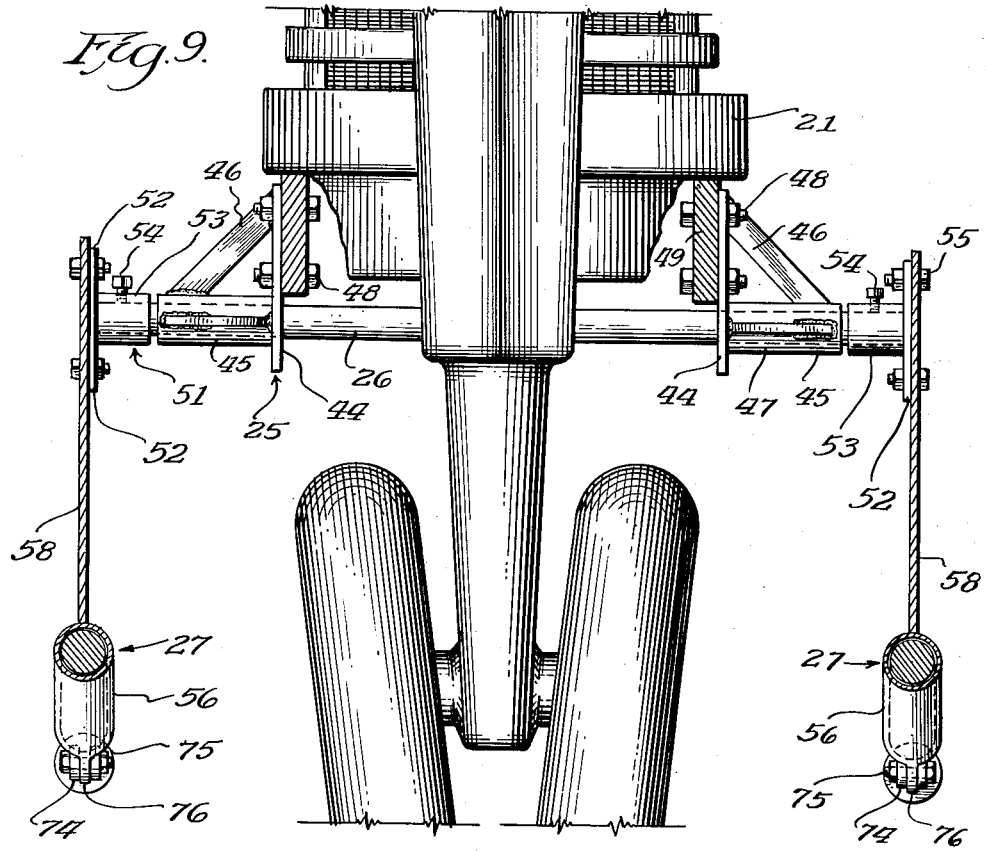
Figure 9 is a top view showing the lever arm as seen in the direction of the arrows along the line 9—9 of Figure 4.
Figures 10, 11:
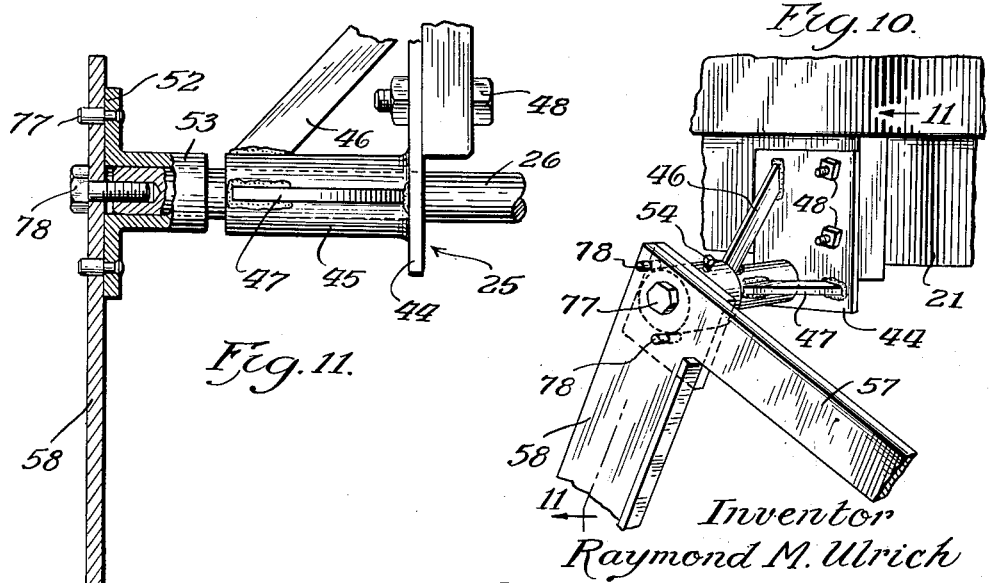
Figure 10 is a perspective view of the front mounting structure shown in Figure 9.
Figure 11 is an enlarged detailed view of the mounting modification shown in Figure 10.

The construction of the forward support 25 is illustrated in detail in Figures 9, 10 and 11. Each bracket or support member 25 consists of a plate 44 which carries a tubular bearing member 45 which has one extremity welded to the plate 44 and which is rigidly held in position by support braces 46 and 47. The plates 44 are provided with a plurality of holes for receiving bolts 48 which pass through the frame 49 of the tractor 21. An equalizing shaft 26 is carried by the bearing portions 45 of the two support brackets 25. At the outer extremity of the equalizing shaft 26 a pair of attachment brackets 51 are provided each consisting of a plate 52 secured to a cylindrical member 53 which in turn is keyed or fastened to the extremity of the equalizing shaft by a suitable means such as a set screw 54. The plate 52 of the attachment brackets 51 on the equalizer shaft 26 are provided with suitable holes for receiving bolts 55 which secure the front lever arms 27 in position.

As is apparent from Figures 1, 2 and 4 each front lever arm 27 is formed of a tubular portion 56 which extends between the extremities of two arms 57 and 58 which have a common pivotal point at the cross shaft 26. The arms 57 and 58 are suitably welded together, and the arm 58 furthermore may be provided with a transversely arranged reinforcing strip 59. The arm 58 is provided with suitable holes through which the bolts 55 pass in order to secure the arm 27 to the equalizer shaft 26. The upper extremity of the tubular portion 56 is provided with a plurality of holes or apertures 61 for receiving a bolt 62 which passes through suitable holes 63 in a U-shaped frame member 64. The frame member 64 consists of two tubular members 65 each having therein the holes 63. The two tubular members 65 are interconnected by transversely arranged tubular member 66 which carries at its outer extremities rollers 67.

The details of the construction of the juncture of the members 65 and 66 together with the roller 67 are shown in Figure 6. From Figure 6 it is apparent that the roller 67 fits within channel of the I-beam 39. Throughout the range of travel of the roller 67 the I-beam 39 is provided with an angle iron or beam 68 which is welded into position. The taper of the inside surface of the angle iron 68 is substantially complementary to the taper of the inside surface of the I-beam 39, thereby providing for the roller 67 a surface which is substantially normal to the web of the I-beam 39. The cross member 66 adjacent its center is provided with a U-shaped loop 69 for receiving a rope, chain or hook when a portion of the loader mechanism is to be employed as a boom.

Figure 4 also illustrates the connection between the lower extremity of the tubular member 56 and the piston rod 71 of the hydraulic cylinder 72. The hydraulic piston and cylinder 24 comprises a cylinder 72 having therein a piston which is connected to a piston rod 71. The outer extremity of the piston rod 71 is provided with a coupling unit or device 73 which terminates in a bifurcated eyelet portion 74 through which a bolt 75 is passed. The bolt 75 passes through an eyelet or pivoted driving member 76 secured to one extremity of the tubular member 56.

Attention has been directed to the adjustable feature of the rear extremity of the beam member 23 and the adjustable feature of the connection between the lever arm 27 and the U-shaped member 64. The adjustable connections for the rear extremities of the beam members 23 are provided so that a single beam structure may be applied to a number of different types of tractors. The rear adjustment also serves to provide some regulation or control over the amount of lift to be provided in a particular installation so that for particular purposes a different range of operation may be selected.

The adjustable feature of the U-shaped member 64 with respect to the arm 27 provides an arrangement whereby the proper lift is provided for different types of tractors. The adjustable feature also serves to provide additional utility of the apparatus illustrated. This utility is shown by the representation in Figure 3 wherefrom it will be noticed that the I-beam members 23 have been removed from the tractor, and the U-shaped member 64 has been moved outwardly so as to provide a boom for lifting purposes.

A comparison of Figures 1 and 2 will illustrate the difference in the relationship of the lifting lever 27 with respect to the beam 23, since in Figure 1 the U-shaped member 64 is substantially telescoped with respect to the levers 27 whereas in Figure 2 the member 64 extends sufficiently above the upper extremity of the arm 27. This adjustment of the U-shaped member 64 not only provides for proper relation of the mechanism with respect to different size tractors, but also may serve to vary the lifting range throughout which the outer extremity of the beam 23 will operate.

From the construction of the mounting shown in Figures 7 and 8 it is apparent that it is a relatively simple operation to unfasten the rear end of the I-beam 23 and the rear end of the hydraulic cylinders 24 by removing the pin 35. The hydraulic cylinders 24 are connected to a crank or lever 27. The levers 27 are readily demounted as is apparent by Figure 9 by merely removing the eight bolts 55. The tractor then may be backed away from the loader which now rests upon the ground and it is then ready for use in connection with other tasks.

In order to further facilitate the rapidity with which a loader may be removed from the tractor, the front mounting may be modified as illustrated in Figures 10 and 11. From these figures it will be noted that the plate 52 which is secured to the sleeve 53 mounted on the extremity of the glider shaft 26 is provided with a plurality of pins 77 which pass through suitable holes in the arm 58. A cap screw 78 is threaded into the end of the shaft 26 and passes through a hole in the arm 58. Thus with such modification it is unnecessary to remove the two pins 45 shown in Figure 8 and the two cap screws 77 shown in Figures 10 and 11 in order to demount the loader.

From the foregoing it will be appreciated that in accordance with the present invention there has been provided a relatively simple construction in a loader for farm tractors and the like which is readily attached and detached by means of suitable mountings. It furthermore is apparent that in addition to serving as a loader, a portion of the loader may serve as a boom or hoist. All this is accomplished without the necessity of manufacturing a large number of different models in order to accommodate different types of tractors.

While for the purpose of illustrating and describing the present invention, the drawings illustrate certain preferred embodiments, it is to be understood that the invention is not to be limited thereby since variations are contemplated as may be commensurate with the spirit and scope of the invention as set forth in the accompanying claims.

What I desire to protect by United States Letters Patent is claimed as follows:

1. A tractor loader comprising a pair of mounting members for the rear axle of the tractor, a hydraulic cylinder and piston, and an adjustable length beam for each mounting member, both said hydraulic cylinder and piston and said beam being pivotally connected to each mounting by a single removable pin, a pair of mounting members for the front of the tractor frame, a shaft journalled in said pair of mounting members and extending transversely beyond each side of said tractor frame, a pair of bell crank levers removably mounted on the extremities of said shaft, pivotal means each interconnecting one of said cylinders and pistons with one arm of said bell crank levers, means for adjusting the effective lengths of the remaining bell crank arms comprising a U-shaped member interconnecting said arms at their outer extremities, and roller means mounted at the base of said U-shaped member for engaging said adjustable length beams.

2. A tractor loader comprising a pair of mounting members clamped to the rear axle of the tractor, a hydraulic cylinder and piston and an adjustable length beam for each mounting member pivotally connected thereto by a single removable pin, each beam having a channel configuration on the side adjacent the tractor frame, a pair of mounting members for the front of the tractor frame, a shaft journalled in said mounting members and extending transversely beneath and beyond each side of said tractor frame, a pair of bell crank levers removably bolted to the extremities of said shaft, said levers each having a tubular member, pivotal connection means each interconnecting one of said cylinders and said pistons with one arm of said bell crank levers, a U-shaped member formed of tubular material having its legs telescopically engaging the tubular members of said bell crank levers, and roller means carried by said U-shaped member for travelling within the channel configurations of said beams.

RAYMOND M. ULRICH.

REFERENCES CITED

The following references are of record in the file of this patent:

UNITED STATES PATENTS

| Number | Name | Date |
|---|---|---|
| 1,713,030 | Cummings | May 14, 1929 |
| 2,190,056 | Davidson | Feb. 13, 1940 |
| 2,190,061 | Fisher et al. | Feb. 13, 1940 |
| 2,395,622 | Galbreath | Feb. 26, 1946 |
| 2,404,820 | Wuertz et al. | July 30, 1946 |
| 2,415,892 | Koehl et al. | Feb. 18, 1947 |
| 2,419,493 | Hoff | Apr. 22, 1947 |
| 2,427,971 | McNeill, Jr. | Sept. 23, 1947 |
| 2,433,086 | Borgelt | Dec. 23, 1947 |
| 2,453,755 | Perman | Nov. 16, 1948 |
| 2,472,223 | McElhinney | June 7, 1949 |
| 2,490,155 | Pfau | Dec. 6, 1949 |
| 2,495,143 | Simmonds | Jan. 17, 1950 |
| 2,501,797 | Ulrich | Mar. 28, 1950 |